April 25, 1961
C. J. STADLER
2,981,419
BILLET HANDLING APPARATUS
Filed Aug. 8, 1958
7 Sheets-Sheet 3
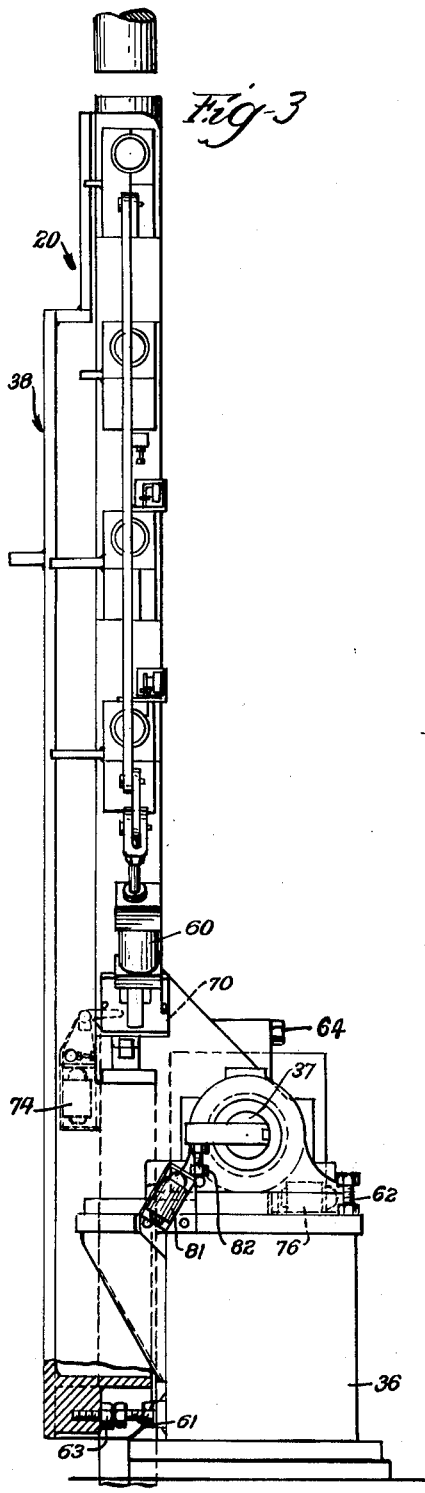
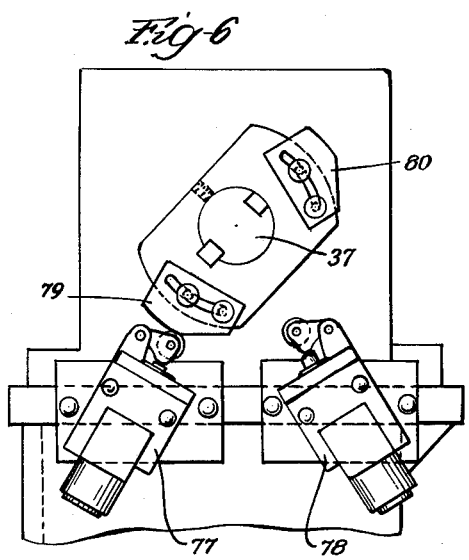
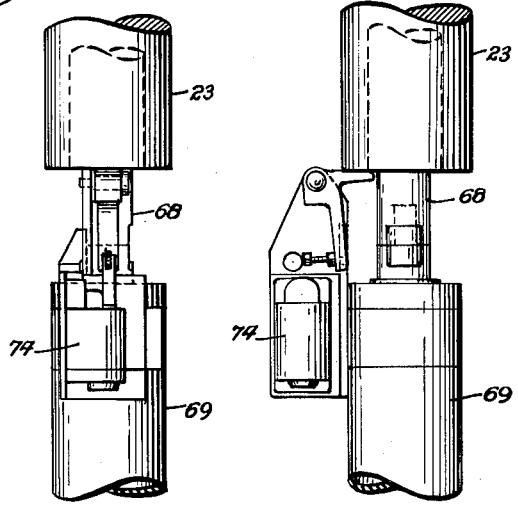
INVENTOR.
Charles J. Stadler
BY
Marshall, Johnston, Cook & Root
Attys April 25, 1961 C. J. STADLER 2,981,419
BILLET HANDLING APPARATUS
Filed Aug. 8, 1958 7 Sheets-Sheet 4
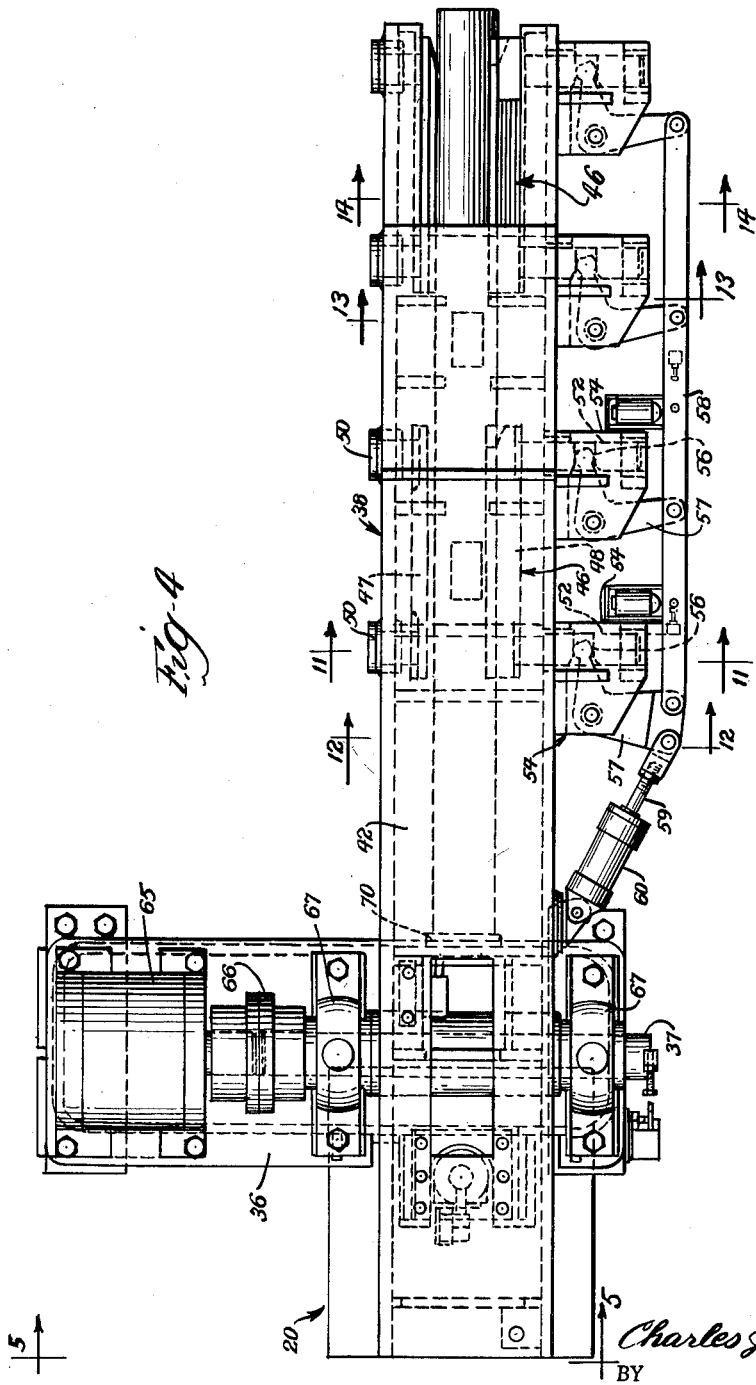
INVENTOR.
Charles J. Stadler
BY
Mazzall, Johnston, Cook + Root
Attys.

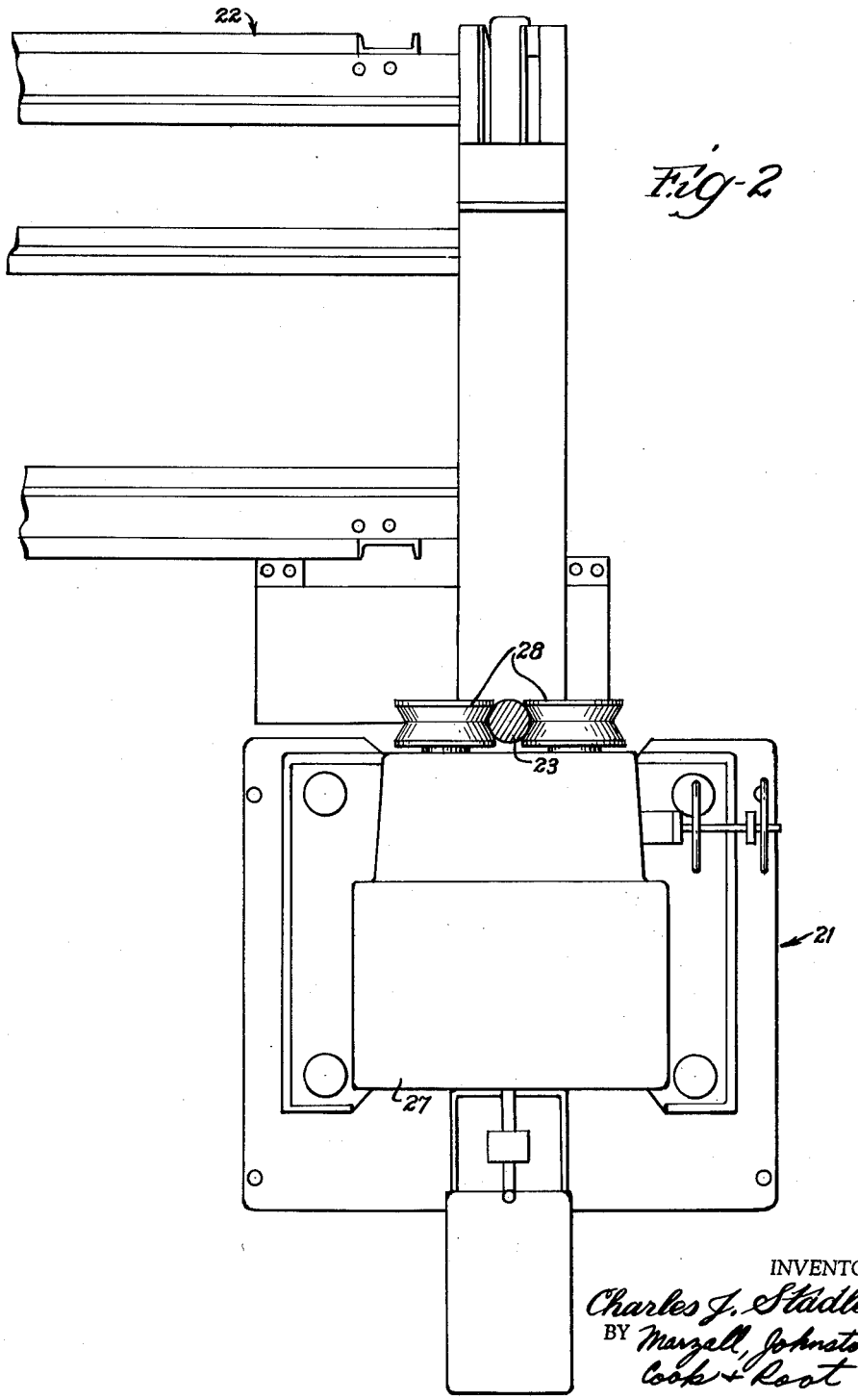

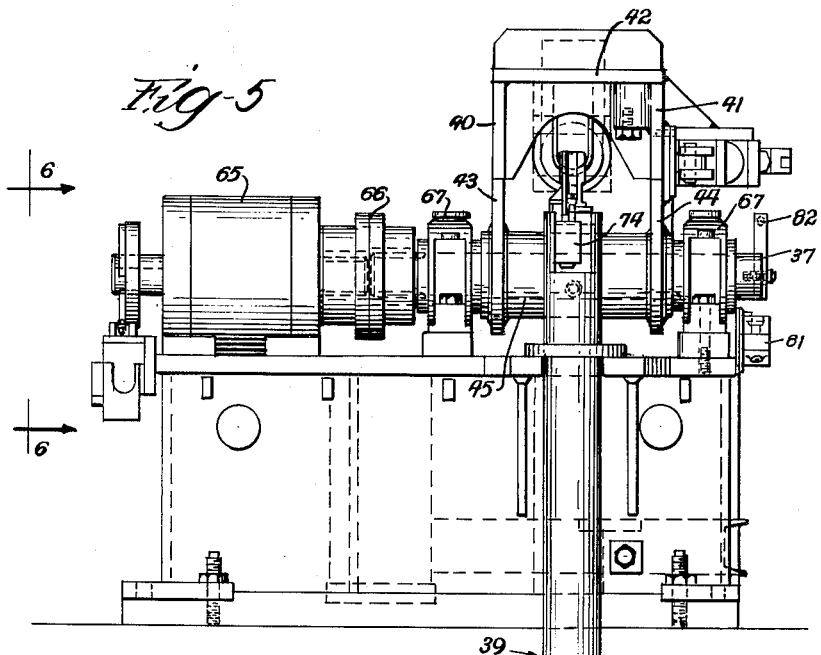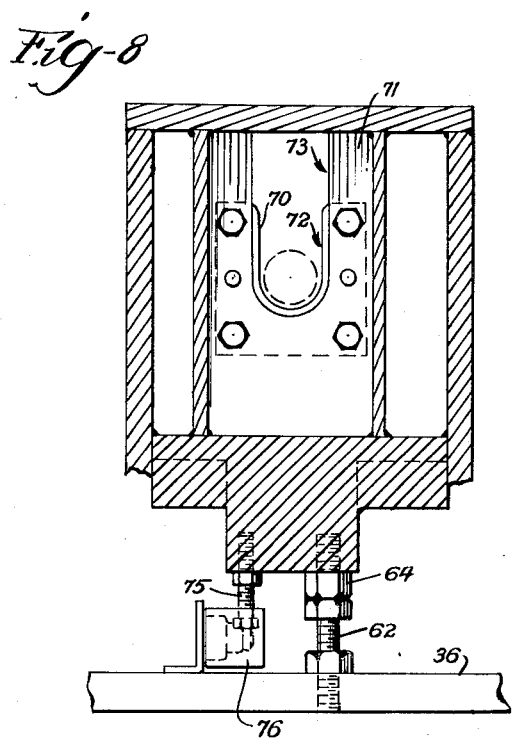

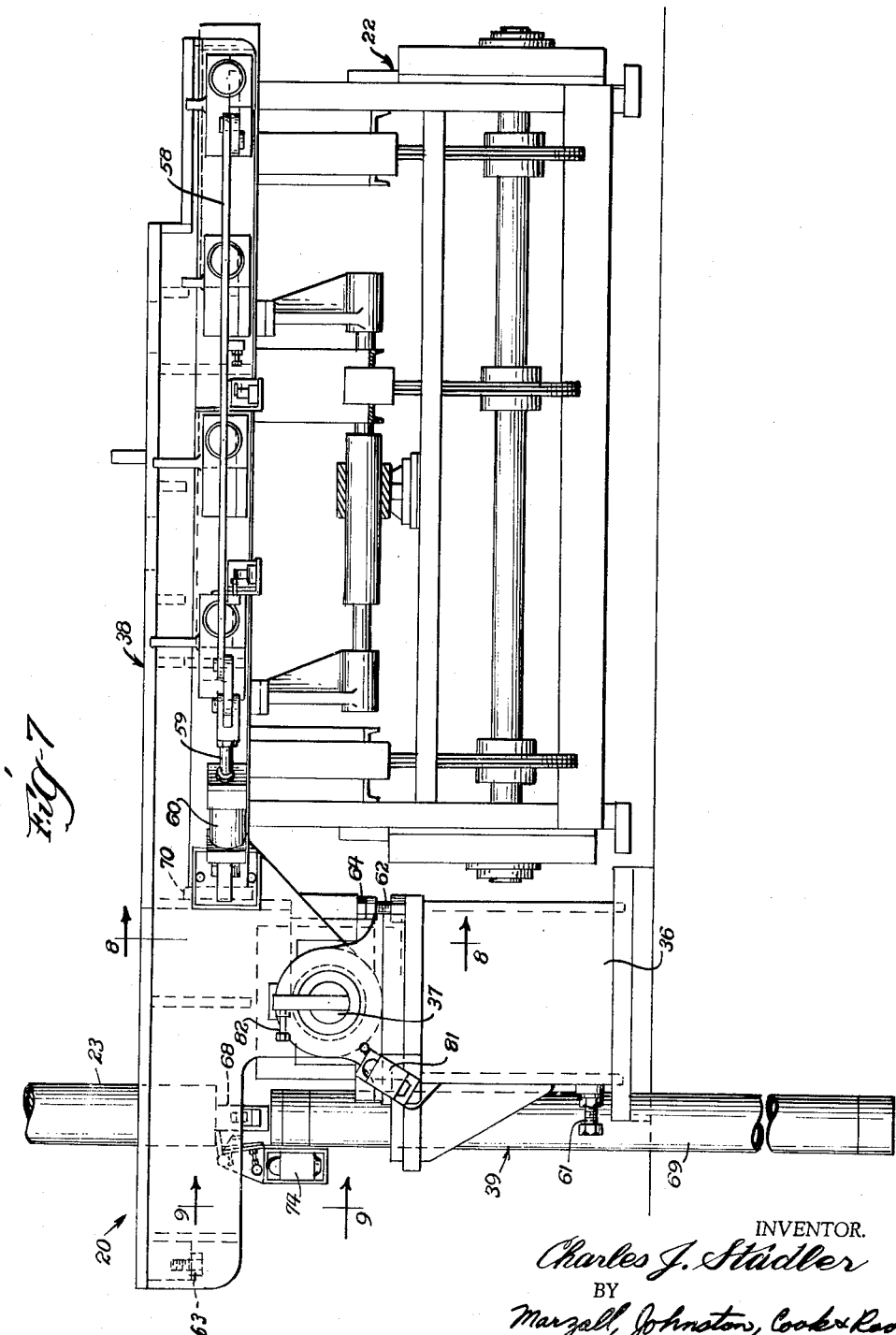

April 25, 1961  C. J. STADLER  2,981,419
BILLET HANDLING APPARATUS
Filed Aug. 8, 1958  7 Sheets-Sheet 7

INVENTOR.
Charles J. Stadler
BY
Marzall, Johnston, Cook & Root
Attys.

United States Patent Office 2,981,419
Patented Apr. 25, 1961

2,981,419

BILLET HANDLING APPARATUS

Charles J. Stadler, Rockford, Ill., assignor to Odin Corporation, Rockford, Ill., a corporation of Illinois Filed Aug. 8, 1958, Ser. No. 753,957

2 Claims. (Cl. 214—1)

This invention relates generally to an apparatus for handling elongated billets, and more particularly to an apparatus for transferring severed lengths of continuous casting or billets from an upright receiving position to a generally horizontal discharge position, and still more particularly to an apparatus in combination with a billet saw and a conveyor which receives severed lengths of continuous casting or billets from the billet saw in an upright position and transfers the severed lengths or billets to the conveyor in a horizontal position.

The transfer apparatus of the present invention includes a base having a rockshaft mounted thereon which carries an elongated, generally channel-shaped billet receptacle. Guides are mounted on the receptacle which serve to confine the path of movement of the casting along the receptacle and hold the severed length of casting or billet during the transfer operation. Each guide includes stationary and movable jaws, and the movable jaws are in "closed" position when the receptacle is receiving the casting and move to "open" position when the severed length of casting is being discharged from the receptacle and onto the conveyor. The receptacle and guides are arranged beneath the billet saw whereby the path of movement of the casting substantially aligns with the guides in their upright position.

Therefore, it is an object of this invention to provide an improved apparatus for handling elongated billets or severed lengths of continuous casting.

Another object of this inveniton is in the provision of an apparatus for transferring severed lengths of continuous casting from an upright receiving position to a generally horizontal discharge position.

Still another object of this invention resides in the provision of a billet transfer apparatus arranged to receive severed lengths of continuous casting or billets from a billet saw and to transfer the severed lengths or billets to a conveyor.

A further object of this invention is to provide a billet transfer apparatus in combination with a billet saw and a conveyor, whereby the transfer apparatus receives billets from the billet saw in an upright position, transfers the billets to a horizontal position and onto the conveyor.

A still further object of this invention is to provide a billet transfer apparatus which receives billets from a billet saw and includes means for cushioning the descent of a billet as it is discharged to the transfer apparatus.

Another object of this invention is in the provision of a billet transfer apparatus having a billet receptacle with means for controlling the movement of a billet into the receptacle.

Another object of this invention resides in the provision of an apparatus for transferring severed lengths of continuous casting or billets from an upright receiving position to a generally horizontal discharge position which comprises an elongated, generally channel-shaped receptacle mounted for tilting movement and having a cushion means for controlling the descent of a billet into the receptacle which includes a hydraulically operated ramrod for engaging the lowering end of a billet.

Still another object of this invention is to provide smooth handling in transferring severed lengths of casting or billets from a billet saw to a conveyor, without damaging the billets in any way.

Other objects, features, and advantages of the invention will be apparent from the following detailed disclosure, taken in conjunction with the accompanying sheets of drawings, wherein like reference numerals refer to like parts, in which:

Fig. 2 is a top plan view of the apparatus shown in Fig. 1;

Fig. 3 is an enlarged side elevational view of the billet handling apparatus, illustrating the billet receptacle in upright receiving position;

Fig. 4 is a top plan view of the billet transfer apparatus, illustrating the billet receptacle in horizontal discharge position;

Fig. 5 is an elevational view of the billet handling apparatus, taken substantially along line 5—5 of Fig. 4;

Fig. 6 is an enlarged view of a detail, taken substantially along line 6—6 of Fig. 5;

Fig. 7 is a side elevational view of a billet handling apparatus as seen in Fig. 4;

Fig. 8 is an enlarged transverse sectional view, taken substantially along line 8—8 of Fig. 7;

Fig. 9 is an enlarged detail view, taken substantially along line 9—9 of Fig. 7;

Fig. 10 is a side elevational view of the detail of Fig. 9;

Figure 1:
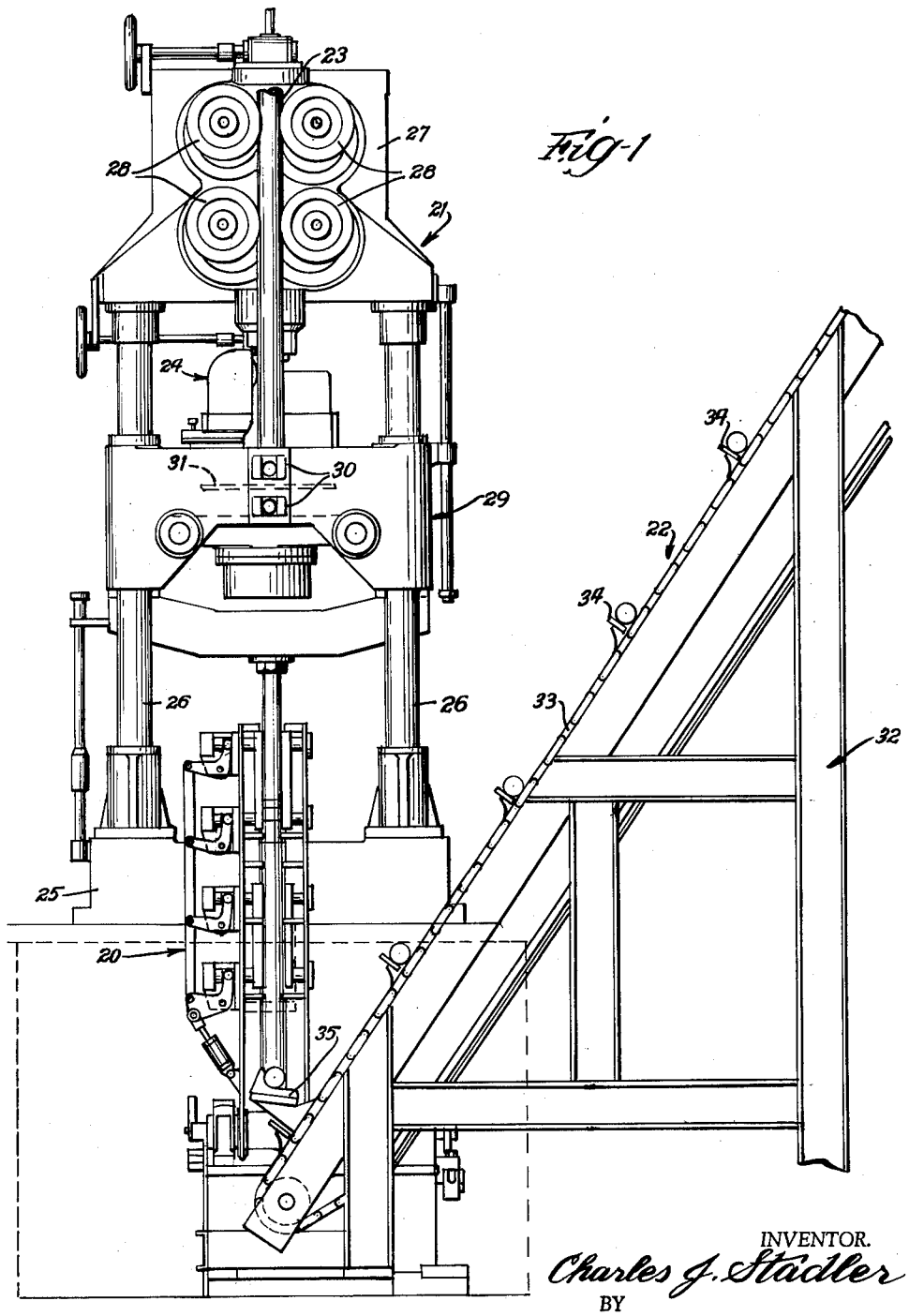
Fig. 1 is a front elevational view of the billet transfer apparatus of the present invention illustrating its positioning with respect to a billet saw and a conveyor.

Referring now to the drawings and especially to Fig. 1, the billet handling apparatus of the present invention, generally designated by the numeral 20, is illustrated in positioned relationship with a billet saw 21 and a billet conveyor 22, wherein severed lengths of continuous casting or billets are received by the billet handling apparatus 20 from the billet saw 21 and transferred to the billet conveyor 22.

The billet saw 21 cuts moving billet stock or continuous casting 23 into lengths of predetermined dimension measured by a measuring device 24 mounted on the billet saw. Thus, the measuring device 24 serves to measure lengths of stock from the continuously formed billet or casting as the billet passes through the machine. The billet stock may be continuously formed from a casting furnace (not shown).

The billet saw 21 further includes a base 25 of generally rectangular shape having four vertical posts 26 upstanding from the corners of the base.

A stationary feeding head 27 is carried at the upper ends of the posts 26 and has mounted thereon coacting power driven feed rollers 28. The feed rollers engage opposite sides of the billet stock 23 and feed it downwardly through the machine. The roller driving mechanism is mounted within the head 27 including mechanism for adjusting the spacing between coacting opposite rollers and tensioning of the rollers relative to gripping of the billet stock. A prime mover, such as an electric motor, may be employed to drive the rollers 28, and the motor may be controlled automatically in any desired manner for advancing the billet at a rate corresponding to the rate of billet formation.

A vertically movable carriage 29 slides along the posts 26 along a rectilinear path parallel to the billet stock path. Clamping assemblies 30 are arranged on the carriage 29 for clamping the billet stock thereto during a cutting operation carried on by a circular saw 31.

A fragmentary portion of the conveyor 22 illustrated in Fig. 1 comprises a framework 32 arranged to carry a pair of endless chains 33 (only one shown) trained over spaced sprockets and having mounted thereon a plurality of spaced flights 34. The flights are adapted to engage a billet and elevate it to further handling apparatus. The billet handling apparatus 20 actually deposits the billets on a set of receiving arms 35 which, in turn, deposit each billet on a flight of the conveyor.

The billet handling apparatus 20 includes generally a base 36, a rockshaft 37 journalled on said base, a billet receptacle 38 carried by said rockshaft and a cushion 39 mounted on the base, Fig. 7.

Figure 11:
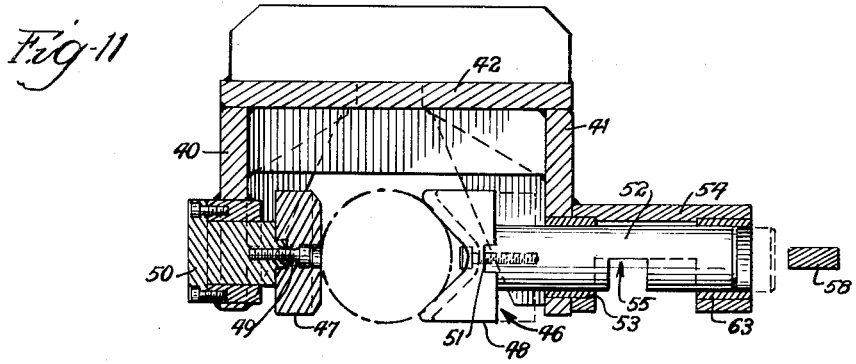
Fig. 11 is an enlarged transverse sectional view, taken substantially along line 11—11 of Fig. 4 and illustrating guides used in the handling of cylindrical billets.
Figure 12:
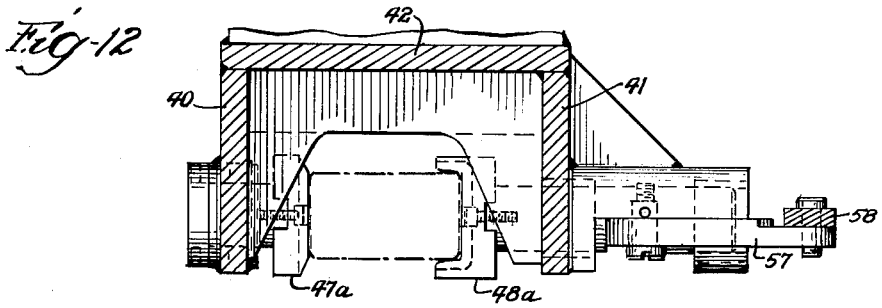
Fig. 12 is an enlarged transverse sectional view, taken along line 12—12 of Fig. 4 and illustrating guides employed in the handling of a billet of rectangular cross-section.
Figure 13:
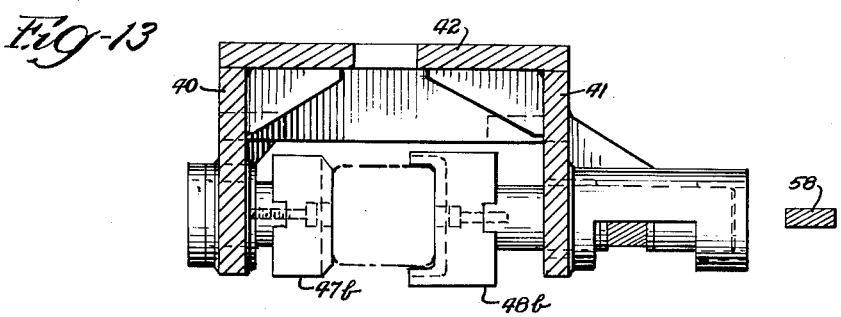
Fig. 13 is an enlarged transverse sectional view taken substantially along line 13—13 of Fig. 4 and illustrating guides employed in the handling of billets of square cross section.

The billet receptacle 38 is generally channel-shaped as seen by the sectional views of Figs. 11, 12 and 13, and includes parallel opposed walls 40 and 41 interconnected by a transversely extending wall 42. A pair of aligned ears 43 and 44 extend from the walls 40 and 41, respectively, in slightly spaced relation from one end of the receptacle, Figs. 5 and 7, and have extending therebetween a sleeve 45 which is journalled on the rockshaft 37. The receptacle is open at its outer end and opposite the wall 42, and the wall 42 terminates inwardly from the end of the receptacle remote from the rockshaft, Figs. 4 and 7.

A plurality of guides 46, Fig. 4, are mounted on the receptacle for guiding the billets into the receptacle and for holding them in position during the transfer operation. Any number of guides may be provided, but only two are provided in the instant case.

Figure 14:
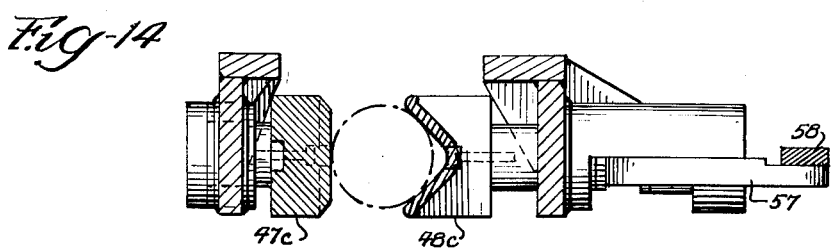
Fig. 14 is an enlarged transverse sectional view, taken substantially along line 14—14 of Fig. 4 and illustrating guides employed in the handling of a cylindrical billet of smaller cross section.

As seen in Figs. 4 and 11, each guide 46 includes a stationary jaw 47 and a movable jaw 48. The jaws are elongated as seen in Fig. 4 and may differ in size and configuration depending on the type of billet being handled. For example, Fig. 12 illustrates a stationary jaw 47a of lesser thickness than the jaw 47 of Fig. 11, while Figs. 13 and 14 illustrate stationary jaws 47b and 47c thicker than the jaw 47 of Fig. 11. Similarly, the movable jaw 48 of Fig. 11 is of a configuration for the handling of a cylindrical billet in combination with the stationary jaw 47. Fig. 12 illustrates a movable jaw 48a coacting with the stationary jaw 47a to accommodate a billet having a rectangular cross section, while the movable jaw 48b of Fig. 13 coacts with the stationary jaw 47b for handling of a billet of square cross section, and the movable jaw 48c of Fig. 14 coacts with stationary jaw 47a to handle a cylindrical billet of different sizes than that handled by the embodiment of Fig. 11.

It may be noted that the stationary jaws 47 are secured by means of cap screws 49 to a pair of mounting blocks 50, Figs. 4 and 11, carried by the wall 40 of the receptacle. Accordingly, removal of the cap screws 49 enables the changing of the stationary jaw 47.

The movable jaws 48 are secured at opposite ends by means of cap screws 51 to a pair of slide bars 52 reciprocable in slide bearings 53 carried by brackets 54. Slots 55 are provided in the slide bars 52 for receiving the end of an arm 56 of crank arms 57. Each crank arm is pivotally mounted on a corresponding bracket 54 and has its other arm pivotally connected to an elongated connecting bar 58, whereby actuation of the bar 58 operates in unison all of the crank arms 57 and the movable jaws 48.

The crank arm 57 closest to the rockshaft 37 also is pivotally connected to the end of a piston rod 59 of a hydraulic cylinder 60. The body of the hydraulic cylinder is pivotally connected to the wall 41 of the receptacle. Thus, actuation of the hydraulic cylinder 60 moves the movable jaws 48 of the guides between open and closed positions. In closed position, the movable jaws coact with the stationary jaws to provide the free movement of the billet between the jaws and into the receptacle, while being positioned to maintain the billets in position during transfer operation.

Movement of the billet receptacle 38 between the extreme upright position and the extreme generally horizontal position is limited by stops 61 and 62 mounted on the base 36, Fig. 3, which coact with stops 63 and 64 on the receptacle. Also see Fig. 7. Power to actuate the rockshaft 37 is provided by a hydraulic motor 65 mounted on the base 36, Fig. 4. The motor is connected to the rockshaft by means of a flexible coupling 66. It may be noted that the rockshaft 37 is supported by a pair of spaced pillow block bearings 67 which are carried by the base 36, Figs. 4 and 5. The sleeve 45 of the billet receptacle is connected to the rockshaft 37 for movement therewith.

Controlling the descent of a billet being lowered into the receptacle when the receptacle is in the upright receiving position is the cushion 39 which includes a ramrod 68 and a cylinder 69. The ram rod 68 constitutes the piston rod of the cylinder 69 and engages the lowering end of the billet as it passes through the receptacle. The ramrod 68 gently permits the lowering end of the billet to engage and bottom on a stop pad 70 secured to a cross member 71 at the end of the receptacle adjacent the rockshaft, Figs. 4, 7 and 8. In order to provide clearance for the ramrod 68 which would extend upwardly through the receptacle prior to lowering of the billet thereinto, a slot 72 is provided in the stop pad 70 aligning with a slot 73 in the cross member 71, Fig. 8.

In the operation of the present invention, the billet receptacle 38, in its upright position, as seen in Figs. 1 and 3, will receive the billet stock. In this position, the guides 46 of the billet receptacle will be closed for guiding the billet stock into proper position within the receptacle, and the tip of the ram rod 68 will be in contact with the lowering end of the billet stock. The ramrod and billet will descend at the rate of billet stock movement through the billet saw 21 until the saw completes its cut and releases the billet. Then the weight of the billet increases the speed of the confining cylinder ramrod and it descends at a more rapid rate.

The billet and cylinder ramrod will continue to descend until the billet lowering end engages and trips a switch 74, Figs. 7, 9 and 10, which signals actuation of the hydraulic motor 65 to swing the billet receptacle 38 into the generally horizontal discharge position as seen in Figs. 4, 5 and 7. The lowering end of the billet will bottom on the stop pad 70 immediately after tripping the switch 74, and the closed guides 46 will hold the billet within the receptacle during the transfer operation.

When the billet receptacle 38 reaches the generally horizontal discharge position, an adjustable trip 75, Fig. 8, trips a switch 76 mounted on the base 36 thereby causing actuation of the cylinder 60 to open the guides and release or discharge the billet to the arms 35 on the conveyor 22. The released billet kicks a switch on the conveyor mechanism causing the billet receptacle 38 to swing back into its upright position.

Speed of the billet receptacle movement is controlled by roller actuated speed control valves 77 and 78 and cams 79 and 80, respectively, which are carried on the rockshaft 37. These valves control the speed of the hydraulic motor 65.

When the upright position of the billet receptacle is again reached, a switch 81 mounted on the stationary base 36, Figs. 3, 5 and 7, is tripped by an adjustable pin 82 carried by the rockshaft 37. Tripping of this switch signals the guide cylinder 60 to advance the guides into closed position for receiving the descending billet, and signals the cushion cylinder 69 to elevate the ramrod 68 into contact with the lowering end of the next oncoming billet.

It will be understood that modifications and variations may be effected without departing from the scope of the novel concepts of the present invention, but it is understood that this application is to be limited only by the scope of the appended claims.

The invention is claimed as follows:

1. Apparatus for transferring severed lengths of continuous casting from an upright position to a generally horizontal position comprising a base, a rockshaft bearingly mounted on said base, an elongated generally channel-shaped receptacle carried by said rockshaft for movement between an upright receiving position and a generally horizontal discharge position, said receptacle having an outer open end and a stop pad adjacent the other end to support the severed casting therein, a plurality of spaced sets of coacting members on said receptacle adapted to guide movement of a casting into the receptacle and hold a severed casting during the transfer operation, each set of members including stationary and movable jaws, means for operating the movable jaws in unison to discharge a severed casting when the receptacle reaches horizontal position, and cushion means on said base controlling the movement of the casting into said receptacle, said cushion means including a hydraulic cylinder mounted on said base and a ramrod operable by said cylinder to engage the lowering end of the casting.

2. Apparatus for transferring severed lengths of continuous casting from an upright position to a generally horizontal position comprising a base, a rockshaft bearingly mounted on said base, an elongated generally channel-shaped receptacle carired by said rockshaft for movement between an upright receiving position and a generally horizontal discharge position, said receptacle having an outer open end and a stop pad adjacent the other end to support the severed casting therein, a plurality of spaced sets of coacting members on said receptacle adapted to guide movement of a casting into the receptacle and hold a severed casting during the transfer operation, each set of members including a pair of coacting jaws at least one of which is movable, means for operating the movable jaws in unison to discharge a severed casting when the receptacle reaches horizontal position, and cushion means on said base controlling the movement of the casting into said receptacle, said cushion means including means for raising said ramrod into engagement with the lowering end of the casting and controlling the descent of the ramrod and casting.

References Cited in the file of this patent

UNITED STATES PATENTS

| | | |
|---|---|---|
| 1,962,848 | Theologus | June 12, 1934 |
| 2,010,820 | Larson | Aug. 13, 1935 |
| 2,582,329 | Harter et al. | Jan. 15, 1952 |
| 2,611,498 | Broersma | Sept. 23, 1952 |